April 10, 1945.  E. S. HOOBLER  2,373,398
TRACTOR AND TRAILER CONSTRUCTION
Filed April 6, 1943  3 Sheets-Sheet 1
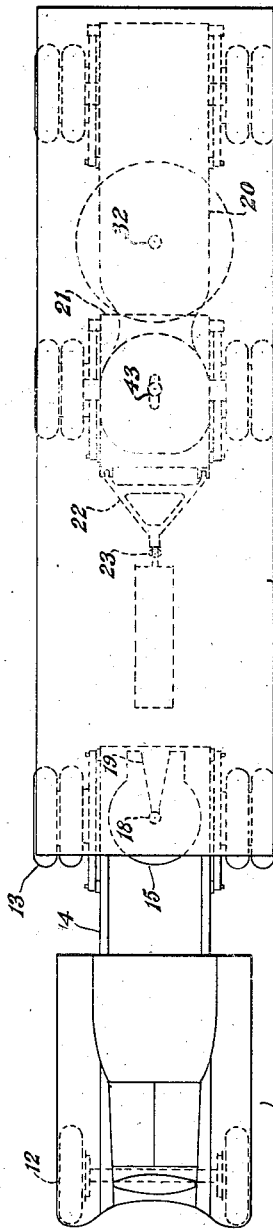
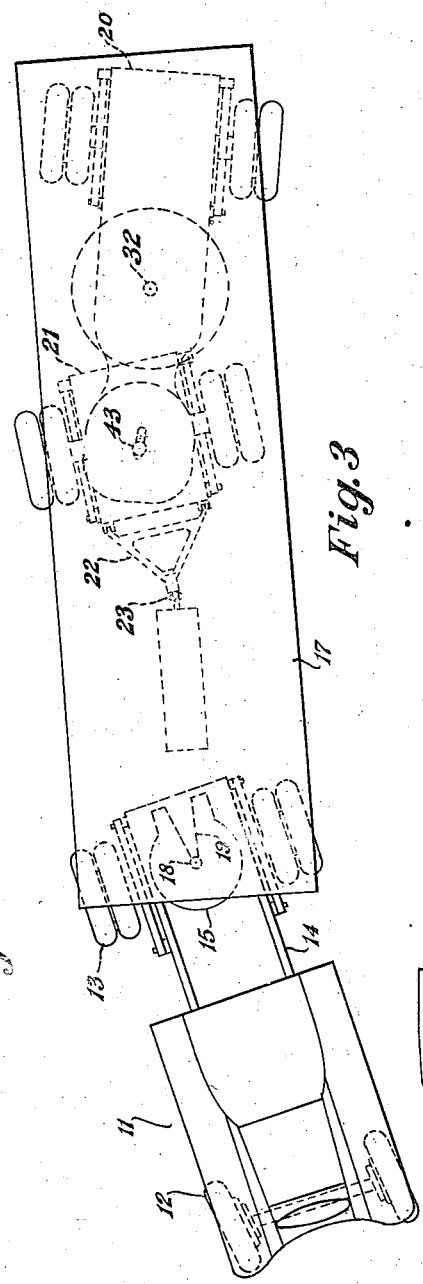
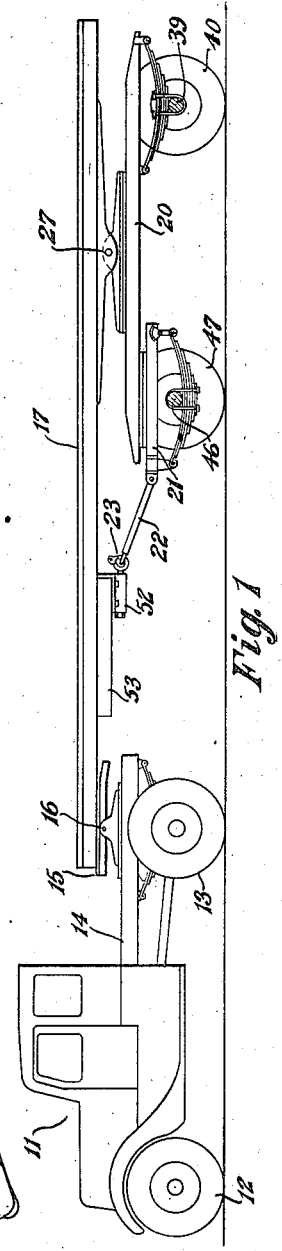
Inventor
*Ernest S. Hoobler*
By *Frease and Bishop*
Attorneys April 10, 1945.   E. S. HOOBLER   2,373,398
TRACTOR AND TRAILER CONSTRUCTION
Filed April 6, 1943   3 Sheets-Sheet 2

Inventor
Ernest S. Hoobler
By Frease and Bishop
Attorneys

April 10, 1945  E S HOOBLER  2,373,398
TRACTOR AND TRAILER CONSTRUCTION
Filed April 6, 1943  3 Sheets-Sheet 3
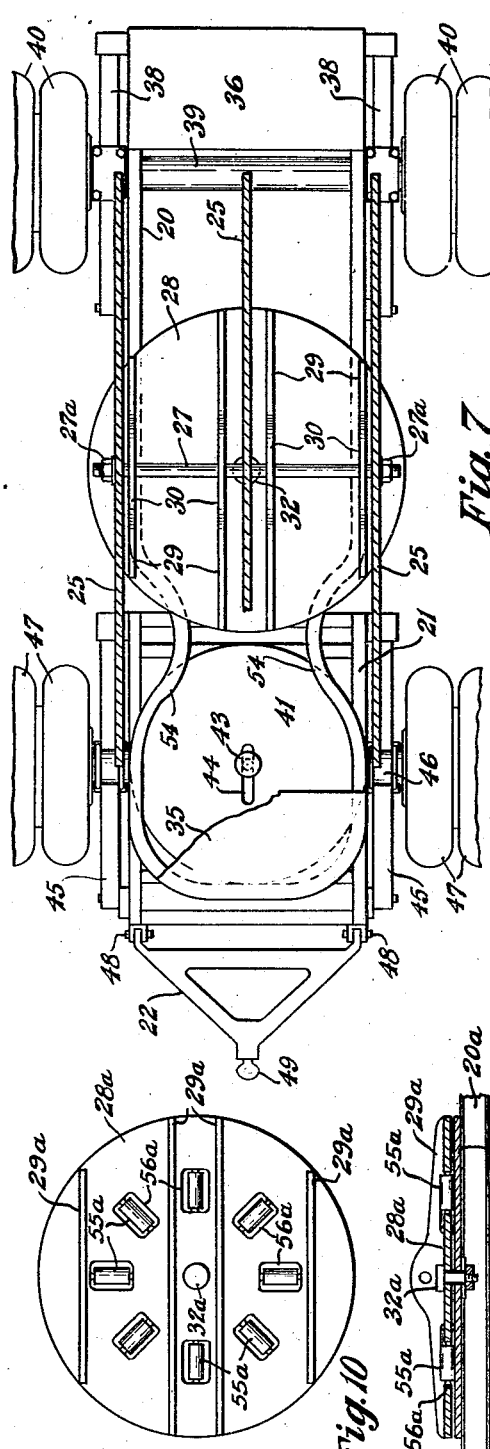
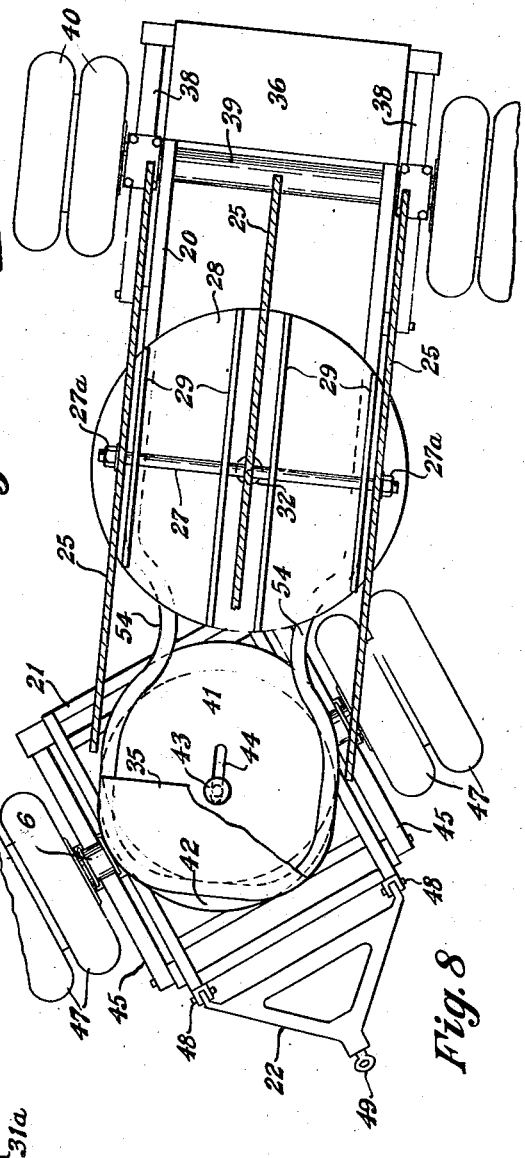
Inventor
Ernest S. Hoobler
By Frease and Bishop
Attorneys Patented Apr. 10, 1945

2,373,398

UNITED STATES PATENT OFFICE

2,373,398

TRACTOR AND TRAILER CONSTRUCTION

Ernest S. Hoobler, Canton, Ohio, assignor, by direct and mesne assignments, of one-fourth to Marie Hoobler, one-eighth to Russell J. Oyler, one-eighth to Grace E. Oyler, one-eighth to William E. Oyler, and one-eighth to Ruth Oyler, all of Canton, Ohio Application April 6, 1943, Serial No. 481,975

6 Claims. (Cl. 280—33.2)

The invention relates generally to tractor and trailer vehicles for highway transport service, and more particularly to a tractor and trailer construction adapted for carrying a maximum pay load without exceeding allowable overall length and gross loads per axle as set by law in many States, and without causing excessive wear on tires and working parts.

A conventional tractor and trailer construction includes a tractor and semi-trailer combination in which the front end of the semi-trailer is connected by a usual fifth wheel to the rear end of the tractor, in order to eliminate one trailer axle and increase the pay load, and the rear end of the semi-trailer is supported on an axle and set of wheels. With this construction, the allowable gross load for the semi-trailer is the total of a fixed amount for the rear tractor axle and a fixed amount for the semi-trailer axle. For example, in certain States the allowable gross load is 18,000 pounds per axle, or a total of 36,000 pounds.

In order to increase the total load capacity an additional four wheel trailer is sometimes coupled to the rear of the semi-trailer, but this combination produces a long train which is hard to pull and to manipulate, and the weight of the front axle and wheels of the four wheel trailer detract from the possible pay load; moreover the overall length of the train may not exceed the allowable limit, which is as low as 40 feet in certain States. Furthermore, such combination involves extra time and labor for coupling and uncoupling the four wheel trailer, and the four wheel trailer tends to weave on the road, producing excess wear on the tires and presenting a serious hazard.

Tandem axles have been proposed for semi-trailers in order to increase the pay load capacity, but such axles are necessarily closely spaced to minimize wear on the tires when turning, and the allowable gross loads on a tandem axle are relatively low; for example, where the allowable gross load for a single axle is 18,000 pounds, the allowable gross load for a tandem may be 12,000 pounds per axle. Thus when the additional weight of the tandem is deducted, the increase in pay load carried by the tandem is quite small, and there is added the disadvantage of increased wear on tires and working parts because the tires of the tandem must slide in order to make a turn.

In a conventional semi-trailer the length of the load carrying platform is limited by the strength of the semi-trailer over the span between the rear axle of the tractor and the axle of the semi-trailer, and it is frequently desirable to carry freight bars which are too long for the platform of a conventional semi-trailer.

Moreover, any of the aforesaid conventional tractor and trailer combinations are subjected to severe shocks due to uneven road surfaces, especially when heavily loaded, resulting in excessive wear not only on the trailer parts and tires, but also on the road surface.

It is therefore a general object of the present invention to provide a novel tractor and trailer combination which will overcome all of the foregoing disadvantages.

More specifically, it is an object of the present invention to provide a novel and improved tractor and trailer construction which will carry increased pay load without exceeding the allowable gross load per axle or the allowable overall length.

Another object is to provide an improved tractor and trailer construction which can be safely and easily pulled and manipulated, either straight away or around curves.

A further object is to provide an improved tractor and trailer construction which has minimum weight with maximum load capacity, and which when used results in a minimum amount of wear and shock on the trailer parts and tires, as well as on the road surfaces.

Another object is to provide an improved tractor and trailer construction in which the axles of the trailer are self-aligning, causing the wheels of successive axles to track properly when making turns.

A still further object is to provide a novel tractor and semi-trailer construction having a load carrying platform capable of carrying freight bars of increased length without exceeding allowable overall length limits.

Finally, it is an object of the present invention to provide a simple, economical, easily constructed and operated construction which accomplishes all of the foregoing objectives.

These and other objects are attained by elements, combinations and sub-combinations comprising the present invention, preferred embodiments of which are shown by way of example in the accompanying drawings, and which is hereinafter described and claimed.

In general terms the invention includes providing a semi-trailer with a sub-frame under the rear end of the trailer platform and connected between its ends by a fifth wheel to the platform, with a dolly under the front end of the sub-frame and having a sliding pivotal connection therewith, the dolly being also pivotally connected by means of a tongue to the forward portion of the platform.

In the drawings forming part hereof,

Figure 1 is a side elevation with parts in section of the novel tractor and trailer construction;

Fig. 2 is a plan view thereof;

Fig. 3 is a similar view showing the position of the parts in making a turn;

Fig. 7 is an enlarged fragmentary plan view similar to Fig. 2, with the semi-trailer platform removed;

Fig. 8 is a similar view, showing the parts in position to make a sharp turn;

Fig. 9 is a detached fragmentary sectional view of a modified fifth wheel connection between the trailer platform and sub-frame; and Fig. 10 is a plan view thereof.

Similar numerals refer to similar parts throughout the drawings.

Figure 6:
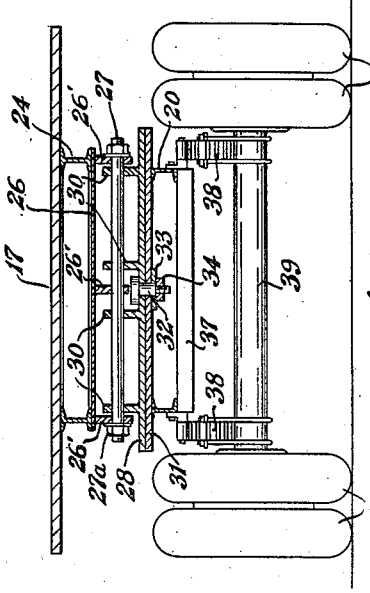
Fig. 6 is a transverse sectional view as on line 6—6, Fig. 4.

The various figures in the drawings are more or less diagrammatic in that certain details of well known parts and structures are not shown.

The present invention is embodied in a tractor and semi-trailer construction including a tractor indicated generally at 11 having front wheels 12 and rear wheels 13. The frame 14 of the tractor carries on its rear end a fifth wheel indicated generally at 15, of well known construction and arranged to rock about its horizontal axis indicated at 16.

A semi-trailer having a load carrying platform 17 is coupled to the tractor, and the front end of the platform is provided with the usual king pin 18 for entering the guideway 19 in the fifth wheel 15 and engaging the socket of the fifth wheel to form a vertical pivot about which the trailer can swing horizontally relative to the tractor.

The parts thus far described are of usual and well known construction and per se form no part of the present invention.

The rear end portion of the semi-trailer platform is supported on a subframe indicated at 20 and the front end of the subframe is supported on a dolly frame 21 to the front end of which is pivotally connected a tongue 22 having a towing connection at 23 with the forward portion of the trailer, whereby the dolly frame 21 is pulled by the tractor 11 through the semi-trailer and tongue 22.

Figure 5:
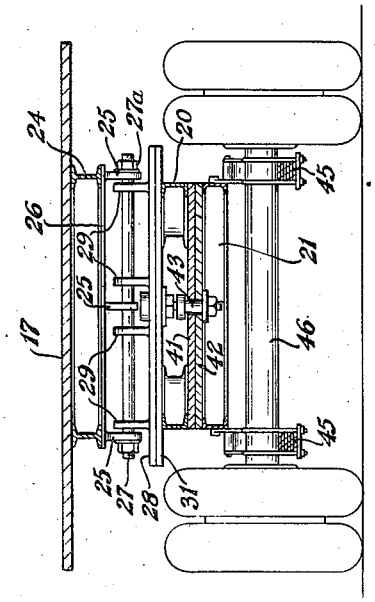
Fig. 5 is a transverse sectional view, as on line 5—5, Fig. 4.
Figure 4:
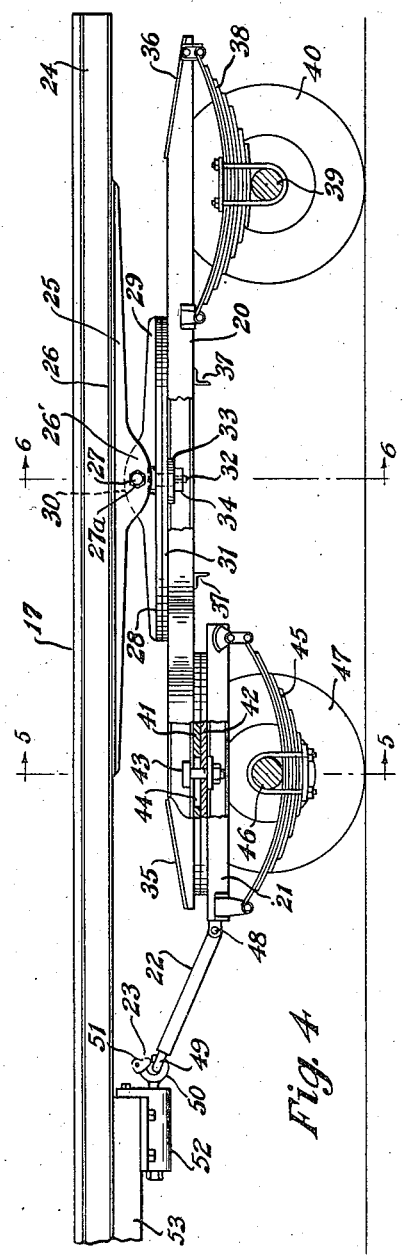
Fig. 4 is an enlarged fragmentary elevation similar to Fig. 1, with parts broken away and parts in section.

Referring particularly to Figs. 4 to 8 inclusive, the subframe 20 is preferably connected to the underside of the trailer frame 24 by a fifth wheel connection including longitudinally extending vertically disposed bracket plates 25 which are spaced laterally of the trailer frame and secured to the underside thereof. As shown, the bracket plates may be welded to a plate 26 which is in turn welded or otherwise secured to the bottom of the frame members. Intermediate their ends the bracket plates 25 are preferably provided with depending ears 26' having bearing apertures through which a rocker shaft 27 is inserted for providing a horizontal pivot for supporting the subframe 20. Nuts 27a are provided on the ends of the shaft 27 for securing the shaft in position.

A horizontal fifth wheel upper plate 28 is pivotally supported on the shaft 27 by means of upstanding bracket plates 29 secured as by welding to the plate 28 and having ears 30 intermediate their ends through which the shaft is slidably inserted.

As shown in Figs. 7 and 8 the fifth wheel upper plate 28 is preferably circular and rests on a lower fifth wheel plate 31 of the same size and shape, which lower plate is carried on the subframe 20 at a position intermediate its ends. A vertical pivot pin 32 extends through the centers of the upper and lower plates 28 and 31 and forms a pivot about which the lower plate 31 of the subframe 20 can swing horizontally in sliding contact with the upper fifth wheel plate 28 of the semi-trailer, and at the same time the subframe can rock about the horizontal shaft 27. Preferably the lower end of the pivot pin 32 is provided with a suitable washer 33 and lock nut 34 for clamping the fifth wheel plates 28 and 31 together.

As shown the bracket plates 25 and 29 are preferably tapered away from each other from their centers outwardly to their ends to permit maximum rocking motion of the subframe, and likewise the ends of the subframe are preferably tapered as shown, for the same purpose.

The subframe 20 may conveniently be constructed of channels as shown, with transverse plates 35 and 36 secured across their tapered ends, and with transverse angles 37 secured to the undersides of the channels and tying them together at their intermediate portions.

As shown the rear end of the subframe is supported by usual leaf springs 38 carried on top of an axle 39 mounting dual wheels 40 in a usual fashion. The front end of the subframe 20 is supported on the dolly frame 21 by means of a sliding pivotal connection which includes a circular upper plate 41 secured to the underside of the front end of the subframe 20 and a circular lower plate 42 slidably supporting the upper plate 41 and secured to the top of the dolly frame 21. A vertical pivot pin 43 is secured in the center of the lower plate 42 and projects upwardly through a longitudinal slot 44 in the upper plate 41. The head of the pivot pin 43 is spaced slightly above the upper plate 41 to prevent binding between plates 41 and 42 as the dolly frame moves up or down and at the same time swings horizontally with respect to the subframe. As shown the dolly frame is supported by leaf springs 45 on an axle 46 carrying dual wheels 47 in a usual fashion, and preferably the springs 45 are underslung with respect to the axle 46 in order to mount the dolly frame 21 under the subframe 20.

The front end of the dolly frame 21 is pivotally connected at 48 to the tongue 22 which is of more or less usual triangular construction having at its apex a ring 49. The ring 49 of the tongue is preferably universally connected to the forward portion of the trailer by means of the usual towing connection indicated generally at 23 including a hook 50 with a latch or keeper 51 mounted thereon, the shaft of the hook 50 being resiliently mounted in a housing 52 which is carried on a beam 53 secured to the trailer frame 24, whereby a yielding or shock absorbing connection is made between the hook 50 and the tongue 22.

The axles 39 and 46 are preferably spaced apart a distance of not less than nine feet in order to permit maximum allowable gross loads per axle on the trailer. The horizontal distance between the front axle 46 and the pivot pin 32 is normally substantially equal to the horizontal distance from the axle 46 to the universal connection 23, and the pivot pin 32 is substantially equidistant from axles 46 and 39, so that as the trailer makes a turn, the wheels 47 will swing a distance substantially equal to the swing of the trailer with respect to the subframe and wheels 40.

As best shown in Figs. 7 and 8, the channel frame 24 comprising the frame is preferably curved or bent inwardly at both sides between the pivot pins 32 and 43, as indicated at 54, to allow sufficient room for turning of the dual wheels 47 carrying the dolly frame 21.

In the modified fifth wheel connection between the trailer platform and subframe shown in Figs. 9 and 10, the bracket plates 29a are secured to an upper fifth wheel plate 28a having circumferentially arranged rollers 55a journalled in slots 56a provided in said plate 28a. The rollers 55a provide anti-friction bearings for rolling on the lower fifth wheel plate 31a as the subframe 20a turns about the pivot 32a.

In the operation of the improved tractor and trailer construction, assuming that the allowable gross load in the States in which the vehicle train is to be used is 7,500 pounds for the front tractor axle and 18,000 pounds for each of the other axles, the total gross load capacity is 7,500 plus three times 18,000, or 61,500 pounds. Deducting the equipment weight of approximately 16,000 pounds gives a pay load of 45,500 pounds.

Comparing this construction with an ordinary tractor and semi-trailer combination, the allowable total gross load for the latter would be 7,500 plus two times 18,000, or 43,500 pounds, minus the equipment weight of approximately 13,500 pounds, which gives a pay load of 30,000 pounds. However, in States where the allowable gross load is 18,000 pounds per axle, the maximum allowable pay load for an ordinary tractor and semi-trailer is approximately 25,000 pounds.

Considering a tractor and semi-trailer having a tandem axle, the allowable total gross load is 7,500 plus 18,000 plus two times 12,000 or 49,500 pounds, minus the equipment weight of 20,000 to 25,000 pounds, which gives a pay load of approximately 24,500 to 29,500 pounds.

Thus the improved tractor and trailer construction comprising the present invention provides a greatly increased pay load capacity without exceeding the allowable gross load limits fixed by law.

Moreover, by providing the improved sub-frame and dolly frame arrangement for supporting the semi-trailer, the length of the semi-trailer platform can be increased sufficiently to carry longer freight bars, because the span between the tractor and the rear fifth wheel is relatively shorter than between the tractor and rear axle of an ordinary semi-trailer.

When the improved construction makes a turn, as shown in Figs. 3 and 8, the dolly frame swings about pivot 23, and the pin 43 slides in slot 44, and trailer swings about pivot 32 while the wheels 47 and 40 move into suitable alignment for substantially tracking wheels 13 of the tractor around a curve. Thus minimum pull on the tractor and minimum wear on the tires and working parts results.

The self-aligning construction of the trailer axles provides for making turns on a much smaller radius, and makes the vehicle train easier to back and manipulate in small narrow spaces.

The self-aligning characteristics of the trailer axles, and particularly the self-aligning or floating character of the dolly, result from the construction described. Thus, the pull of the tractor 11 is transmitted through fifth wheel 15 and king pin 18 to semi-trailer frame 24 and thence through universal towing connection 23, tongue or link 22 and pivotal connection 48 to dolly frame 21 and dolly axle 46 so that at all times during forward movement of the equipment, the dolly frame is positively pulled or towed. Likewise, the pull of the tractor 11 is transmitted through fifth wheel 15 and king pin 18 to semi-trailer frame 24, thence through fifth wheel plates 28 and 31 and pivot pin 32 to sub-frame 20, and thence to sub-frame rear axle 39, so that at all times during forward movement of the equipment, the rear axle is also positively pulled or towed.

As a result, when a turn is made, the axles 46 and 39—each of which in effect is towed or pulled separately—tend to assume relative positions such as shown in Figs. 3 and 8. Meanwhile, the pin and slot connection 43—44 between the dolly 21 and front end of sub-frame 20, allows the dolly to pivot, turn, or rotate relative to subframe 20 and to be pulled forward—accompanied by sliding movement between plates 41 and 42—relative to the sub-frame 20 in consequence of being laterally offset relative to the main trailer frame 24 because of the turning or sidewise movement of the front end of the main trailer. This reaction of dolly 21 to the towing pull of the tractor in making a turn is termed herein a floating or self-aligning action and occurs at the same time that the rear axle accommodates or aligns itself to the towing pull of the tractor in making a turn.

Due to the fifth wheel mounting of the semi-trailer midway between the ends of the subframe, and the sliding pivotal connection between the front end of the subframe and the dolly frame, if wheels 47 or 40 are raised or lowered due to uneven road surface, the semi-trailer will be raised about half as much because of the lever action of the subframe. For the same reasons, when the wheels 47 or 40 strike bumps or holes in the road surface the shock is absorbed by the lever action of the subframe rocking about the rocker shaft 27. Thus the improved construction is particularly adapted for highway passenger transportation, wherein a bus body may be carried on the trailer frame.

The improved construction and mounting of the subframe may be applied to six wheel truck construction, by substituting the subframe for the two rear axles of the truck, thereby obtaining the advantages of reducing shock and smoother riding.

Moreover, the novel semi-trailer construction is adapted to be used with a tandem tractor where it is desired to further increase the pay load in freight hauling.

The improved construction is simple, economical, and easily constructed and operated.

I claim:

1. In tractor and trailer construction, a semi-trailer, a subframe located under the rear end of said semi-trailer, means providing a fifth wheel connection between an intermediate portion of said subframe and the semi-trailer, a set of wheels supporting the rear end of said subframe, a dolly located under the front end of said subframe and having a slot and pin connection with said subframe, a set of wheels supporting said dolly, and tongue means providing a universal towing connection between the dolly and a forward portion of said semi-trailer.

2. In tractor and trailer construction, a semi-trailer, a subframe located under the rear end of said semi-trailer, means providing a fifth wheel connection between an intermediate portion of said subframe and said semi-trailer, said fifth wheel connection including a horizontal pivot and a vertical pivot whereby said subframe can swing laterally and rock vertically relative to said semi-trailer, a set of wheels supporting the rear end of said subframe, a dolly located under the front end of said subframe, a slot and pin connection providing a vertical pivot connection between said dolly and said subframe, a set of wheels supporting said dolly, and means providing a universal towing connection between said dolly and a forward portion of said semi-trailer.

3. Vehicle construction including a load carrying frame, a subframe located under the rear end of said load carrying frame, means providing a fifth wheel connection between the subframe between its ends and said load carrying frame, a set of wheels supporting the rear end of said subframe, a dolly supporting the front end of said subframe, a set of wheels supporting the dolly, tongue means providing a universal towing connection between said dolly and a forward portion of said load carrying frame, and means providing a sliding pivotal connection between said dolly and said subframe.

4. In vehicle construction, a load carrying frame, a subframe located under the rear end of said load carrying frame, means providing a fifth wheel connection between said subframe midway of its ends and said load carrying frame, a dolly supporting the front end of said subframe, a slot and pin connection providing a vertical pivot connection between said dolly and said subframe, and tongue means providing a universal towing connection between said dolly and a forward portion of said load carrying frame.

5. In vehicle construction, a load carrying frame, a wheeled dolly, tongue means connected to the frame and dolly for towing the dolly from the frame, a wheeled subframe, fifth wheel means rearward of the dolly connecting the sub-frame and frame for towing the sub-frame from the frame, means supporting the front of the subframe on the dolly forward of the said fifth wheel means, and said support means including relatively slidable and rotatable members forming a floating connection between the dolly and subframe.

6. In vehicle construction, a load carrying frame, a subframe located under the rear end of said load carrying frame, means providing a fifth wheel connection between an intermediate portion of said subframe and said load carrying frame, said fifth wheel connection including a horizontal pivot and a vertical pivot whereby said subframe can swing laterally and rock vertically relative to said load carrying frame, a dolly supporting the front end of said subframe, means including relatively slidable and rotatable members forming a floating connection between said dolly and said subframe, and means connected to the load carrying frame and dolly for towing the dolly from the load carrying frame.

ERNEST S. HOOBLER.